United States Patent [19]

Knowles et al.

[11] 3,765,911

[45] Oct. 16, 1973

[54] PROCESSING OF RUBBER AND THE LIKE, AND TO PROCESSING COMPOSITIONS THEREFOR

[75] Inventors: Ernest Knowles; Jack Fixman, both of Manchester, England

[73] Assignee: The London Oil Refining Company, Manchester, England

[22] Filed: Oct. 27, 1970

[21] Appl. No.: 84,547

Related U.S. Application Data

[63] Continuation-in-part of Ser. No. 752,105, Aug. 9, 1968, abandoned.

[52] U.S. Cl............... 106/2, 106/13, 117/139, 252/121, 252/131
[51] Int. Cl................................................ C09k 3/18
[58] Field of Search.................. 106/2, 13, 38.24, 106/266; 252/121, 131; 117/139

[56] References Cited
UNITED STATES PATENTS

| | | | |
|---|---|---|---|
| 2,147,312 | 2/1939 | Partridge | 106/2 X |
| 3,519,444 | 7/1970 | Brown et al. | 106/38.24 |
| 3,002,840 | 10/1961 | Kern et al. | 106/2 |
| 2,567,645 | 9/1951 | Limburg | 252/121 |
| 2,390,295 | 12/1945 | Flett | 252/121 |
| 2,986,471 | 5/1961 | Rudd | 106/2 |
| 2,440,626 | 4/1948 | Young et al. | 106/2 X |

OTHER PUBLICATIONS

Rose, The Condensed Chemical Dictionary, 6th Ed., Reinhold, (1961), New York, at page 136.

*Primary Examiner*—Joseph L. Schofer
*Assistant Examiner*—David A. Jackson
*Attorney*—Markva & Smith

[57] ABSTRACT

An anti-tack composition, method of using same, and articles of manufacture including same are provided. The composition consists essentially of a soap constituent, a synthetic detergent and a colloidal clay constituent. Each of the constituents has specific characteristics and relationships with respect to each other and are established in a water base, stable homogenous colloidal dispersion. Any substrate composed of a material having glutinous or adhesive surface properties such as natural and synthetic rubber, plastics, asbestos, bituminous and asphaltic compositions may be coated with the anti-tack composition of the disclosure.

12 Claims, No Drawings

PROCESSING OF RUBBER AND THE LIKE, AND TO PROCESSING COMPOSITIONS THEREFOR

RELATED APPLICATIONS

This application is a continuation-in-part of our application, Ser. No. 752,105 filed Aug. 9, 1968, now abandoned.

BACKGROUND OF THE INVENTION

The invention disclosed herein has reference to the processing of materials which have a tendency to exhibit glutinous or adhesive surface properties. Such materials include natural and synthetic rubber, plastics materials, asbestos, bituminous and asphaltic materials. More specifically, an anti-tack composition is disclosed for use as a parting or separating agent to keep the surfaces of stock materials which exhibit glutinous or adhesive surface properties from sticking together. In both the rubber industry and plastics industry, it is common practice to treat the surfaces of stock articles such as sheets, slabs and elongated pieces composed of rubber, especially unvulcanized rubber, or plastics with an anti-tack composition. This treatment prevents adhesion between the contacting portions of the surfaces when the articles are stacked or coiled as during storage. Powder compositions which are dusted over the surfaces of the materials have often been used in the past. In addition, a number of paste and fluid type anti-tack compositions have also been proposed. However, there remains a need for improvement in this particular art. Provision of a fully satisfactory anti-tack composition and treatment process for materials of the kind set forth, however, presents numerous problems.

Firstly, it is necessary that the composition can be applied effectively and efficiently to the surfaces of the articles of the material being treated and from this point of view a liquid form of composition which can easily be applied and spread to give a uniform and durable surface coating finish is most desirable.

Secondly, in order to be commercially acceptable, not only must it be possible to produce and market the anti-tack composition at a competitive price, but it should also be capable of being transported efficiently and conveniently. Also it must be capable of being readily stored without deterioration and of being delivered to consumers in a form in which it can readily be put into immediate use. Furthermore, it should be free of any deleterious effects upon the materials being treated and upon storage vessels, containers and other parts with which it may come into contact.

SUMMARY OF THE INVENTION

In one aspect, the present invention is based on the concept of providing and using a liquid anti-tack composition which is in the form of a soap solution containing, in suspension, a finely divided surface-active colloidal clay material, and which can be spread as a uniform film over the surfaces of the material being treated to produce, on drying, a uniform and durable coating with very effective anti-tack characteristics.

Thus, an anti-tack composition according to the invention consists essentially of a water base containing
a. a soap constituent including at least one water soluble salt of an unsaturated higher fatty acid having between 16 and 24 carbon atoms,
b. a synthetic detergent selected from the group consisting of a water soluble salt of an alkyl ether sulphate and a water soluble salt of an alkyl alcohol sulphate, and
c. a colloidal clay constituent including at least a strong gelling grade of bentonite in an amount effective to produce a stable homogeneous colloidal dispersion,
d. said constituents being established in a water base, stable homogeneous colloidal dispersion,
e. the amount of the synthetic detergent constituent expressed in parts by weight of the total composition being less than the amount of the soap constituent expressed in parts by weight.

The soap constituent should have low foaming characteristics and may be produced by saponification of any convenient vegetable or animal fat or oil having the appropriate fatty acid content, and such saponification may conveniently be carried out during preparation of the anti-tack composition to yield the fatty acid alkali metal or alkanolamine salts.

As is well known, naturally occurring and commercially available grades of vegetable and animal fats and oils contain a mixture of different fatty acids, although one or two particular fatty acids, or glyceride esters thereof, usually predominate and constitute principal active components. Therefore, it cannot be expected that the soap constituent present will be a pure chemical compound, but soap constituents which are especially useful in the anti-tack composition of this invention consist of water soluble salts of fatty acids having 18 carbon atoms and at least one double bond, such as oleic acids and ricinoleic acid. By the term "oleic acids" it will be understood by those in the art that this may signify not only true oleic acid but also the closely related chemical isomers such as linoleic acid which are usually also present in fats and oils from natural sources, such as in commercially supplied oleine oils for example.

Apart from said oleine oils, which term, as used in the art, includes low rosin containing fatty acid preparations of tall oil derived from the wood pulp industry, another readily available satisfactory natural oil, in which the principal fatty acid components are of an unsaturated type with 18 carbon atoms, is castor oil. Many other natural oils or fats may, however, be used and it is believed that other less commonly occurring unsaturated fatty acids containing a different number of carbon atoms, limited for practical purposes to the range 16 to 24 carbon atoms, may be equally suitable for producing a satisfactory soap and making up anti-tack compositions in accordance with this invention.

The synthetic detergent constituent is present in such amount as to be effective in preventing or reducing formation of precipitates and sludges and to enhance the stability and action of the soap. In general, it is incorporated in smaller molar proportion than the soap constituent, and we have found that particularly useful synthetic detergents in carrying out the invention are alkali metal salts of lauryl ether sulphate and of lauryl alcohol sulphate.

The success of the compositions of the present invention depends on the colloidal clay constituent and, in particular, upon the use of a strong gelling grade of bentonite as opposed to ordinary or non-gelling grades of this material. Bentonites, which are particular clay minerals comprising hydrated aluminum silicates, and usually, alkaline earth oxides, can be obtained in several different forms, both physically and chemically, which have marked differences in behaviour. Thus, certain grades which are in finely divided form and which contain sodium as the principal alkali metal constituent, have gelling properties in water, whereas other grades, especially many bentonites in their naturally occuring unmodified form, have no or only very slight gelling properties.

Under appropriate conditions the gelling grades of bentonite will absorb very large quantities of water, each particle then carrying a similar negative charge and forming a very stable colloidal system in which a gel structure tends to form by partial coagulation of the hydrated particles, especially in mildly alkaline conditions.

In particular, certain naturally occurring bentonites stand out and are known in the art for their exceptionally powerful gelling properties with water, and these are generally referred to and are recognised by the descriptive term "strong gelling grade," and they usually originate amongst the bentonites occurring in parts of Wyoming, U.S.A. or in North Africa.

We have found rather surprisingly that the use of a finely divided strong gelling grade of bentonite, as above referred to, is an essential feature of the anti-tack compositions of this invention, and alternative use of other commercially available grades of this clay is not successful in enabling a stable colloidal dispersion, free from serious sedimentation or settling out, to be produced.

Thus, although we are aware that references exist in the prior literature to the use of bentonite as a filler for soaps and like compositions we know of no directions or teaching leading to the use of a strong gelling grade in accordance with this invention for producing a successful and improved stable liquid anti-tack composition, and we regard our discovery as being a significant advance in the art.

Other factors which are of importance in order to produce a stable colloidal dispersion and satisfactory anti-tack characteristics are the acidity, concentration and relative proportions of the constituents.

In general, slightly alkaline conditions should be maintained and for practical purposes a pH should be established within the range 7 to 10.

In the stable colloidal aqueous dispersion form in which it is prepared, the anti-tack composition may be regarded as a concentrate capable of being transported and stored for long periods without deterioration. When required for use, it can then be applied either in its original state or it may be diluted if desired as although substantial dilution with water may result in loss or a reduction of the stability characteristics this is of no practical consequence at this stage as the clay constituent will still remain in suspension for an adequate time for the treatment process to be completed.

We have also found that in preferred compositions in said concentrate form, the proportion by weight of the soap constituent, which can be estimated from the saponification conditions and approximate known composition of the vegetable or animal fat or oil where the latter is an initial ingredient, should be in the range 5 to 20 percent, while the proportion by weight of the synthetic detergent constituent is advantageously greater than 1.5 percent and less than that of the soap constituent, and the proportion by weight of the strong gelling grade of bentonite is within the range 1 to 10 percent. The proportion by weight of water in the concentrate is advantageously in the range 60 to 80 percent.

We have further found that so long as an appropriate amount of the strong gelling grade of bentonite is present, additional colloidal clay comprising finely divided kaolin, preferably having an average particle size less than 2 microns, can also be incorporated in the composition with advantage for the treatment of materials exhibiting unusually high tackiness.

In addition to the above-mentioned constituents the anti-tack composition may also usefully include small quantities of anti-oxidant, anti-corrosion, stabilising and anti-foaming additives if desired.

The quantities of such additives need not in general exceed 1 percent by weight of the composition, and will usually be substantially less than this amount. In any case, it will be understood that the active constituents necessary and sufficient to provide the satisfactory anti-tack characteristics and physical stability of the aqueous concentrate composition consist essentially of the soap, synthetic detergent and colloidal clay including the high gelling grade of bentonite, and further additional substances, which may possibly be useful for specific purposes or which may form non-active diluents or agents for enhancing certain properties, are not necessarily required or essential for carrying out the invention. It is not, for example, necessary or desirable to incorporate substances such as methyl cellulose which has been proposed previously as an essential constituent for soap based anti-tack compositions.

However, mention may be made of the possible optional use, in relatively small amounts, as an additional useful ingredient, of alginates in the form of sodium, potassium or alkanolamine salts, which have some gelling, stabilising and anti-tack properties effective to enhance such properties already present.

From another aspect, the invention also consists in an article of manufacture composed of a material of a kind which tends to exhibit glutinous or adhesive surface properties, such as natural and synthetic rubber, plastics asbestos bituminous and asphaltic compositions, having thereon a durable surface coating provided by a dried out aqueous anti-tack composition consisting of a composition of the kind hereinbefore described.

The invention further consists in a method of treating natural or synthetic rubber, of other materials having like tendencies to exhibit glutinous or adhesive surface characteristics, by applying to the surface thereof an anti-tack composition of the kind hereinbefore defined in order to form a durable surface coating and act as an effective parting or separating agent.

DESCRIPTION OF SPECIFIC EMBODIMENTS

The manner in which the invention may be carried out will now be further described with reference to the following examples:

EXAMPLE I

In a first specific example of a preferred embodiment of the invention, a parting or separating anti-tack composition is prepared using the following ingredients:

| | Percent by weight |
|---|---|
| Potassium Hydroxide (Anhydrous) | 1.4 |
| Pale Oleine Oil | 8.8 |
| Sodium Lauryl Ether Sulphate (Anhydrous) | 4.4 |
| Bentonite (Strong Gelling Grade) | 6.4 |
| Anti-foaming Agent | 0.33 |
| Formalin (40% Aqueous Solution) | 0.2 |
| Water | to 100% |

The oleine oil is a typical commercial grade yielding over 90 percent oleic and linoleic acids, and the strong gelling grade bentonite is of North African or Wyoming, U.S.A. origin. The anti-foaming Agent, which is an optional constituent, may be any suitable silicone compound of a kind well known in the art, and the formalin is included as a preservative.

In preparing the composition, 80 percent of the required water is heated to 200°F, the Oleine Oil is added and saponified with the Potassium Hydroxide. Saponification is permitted to proceed to completion when substantially the whole of the fatty acid content of the oleine oil is converted into the potassium salts, and then the sodium lauryl ether sulphate is added to this soap solution, the temperature being maintained by continuing heating. When the blend is completely mixed the bentonite is slowly added with stirring such as to ensure that it is fully dispersed before its water absorption and stabilisation action commences. Stirring is continued for 1 hour at the elevated temperature to allow the stabilisation reaction to reach completion and, with the pH controlled to 8.5–8.7, the batch is then cooled down to 90°F, stirring being continued until the whole batch is at 90°F to ensure complete stability over a wide range of storage temperatures.

Instead of potassium hydroxide, sodium hydroxde may also be used with advantage for carrying out the saponification reaction.

Examples of other suitable alternative preparative formulations of the composition are as follows, the initial ingredients being set out as in Example I:

EXAMPLE II

| | Percent by weight |
|---|---|
| Sodium Hydroxide (Anhydrous) | 1.3 |
| Castor Oil (2nd Pressure) | 10.0 |
| Sodium Lauryl Alcohol Sulphate (Anhydrous) | 5.0 |
| Bentonite (Strong Gelling Grade) | 6.5 |
| Silicone Anti-foaming Agent | 0.33 |
| Formalin (40% Aqueous solution) | 0.2 |
| Water | to 100% |

EXAMPLE III

| | Percent by weight |
|---|---|
| Potassium Hydroxide (Anhydrous) | 1.4 |
| Pale Oleine Oil | 8.8 |
| Sodium Alginate | 2.0 |
| Sodium Lauryl Ether Sulphate (Anhydrous) | 4.4 |
| Bentonite (Strong Gelling Grade) | 6.5 |
| Silicone Anti-foaming Agent | 0.33 |
| Water | to 100% |

EXAMPLE IV

| | Percent by weight |
|---|---|
| Triethanolamine Oleate | 15.0 |
| Sodium Cetyl Oleyl Alcohol Sulphate | 5.5 |
| Bentonite (Strong Gelling Grade) | 6.5 |
| Silicone Anti-foaming Agent | 0.33 |
| Water | to 100% |

EXAMPLE V

| | Percent by weight |
|---|---|
| Sodium Hydroxide (Anhydrous) | 0.37 |
| Pale Oleine Oil | 3.5 |
| Lauryl Sodium/Ether Sulphate (Anhydrous) | 1.78 |
| Bentonite (Strong Gelling Grade) | 3.2 |
| Kaolin (Light Colloidal Grade) | 20 |
| Sodium Nitrite | 1.0 |
| Water | to 100% |

In each case, the composition is prepared from the ingredients by the same method as that described in connection with Example I, except that in Example IV the ready-prepared soap is used as an initial ingredient and no further saponification is required.

In Example V, in addition to the important strong gelling grade bentonite the clay constituent also includes a substantial quantity of finely divided colloidal kaolin which may be added during the final stirring stage of the procedure described for Example I, and a small proportion of sodium nitrite is also included which is helpful in controlling the viscosity of the composition. It has been found that the presence of the kaolin can reduce the drying time required after applying to the surfaces of the materials being treated and can enhance the anti-tack characteristics and enable a lesser amount of the composition to be used especially in the treatment of materials exhibiting unusually high surface tackiness. The latter may occur, for example, with rubber stored under certain conditions at elevated temperatures.

As previously pointed out, the anti-tack composition, as prepared, represents a concentrate form, and although it may be used directly in this form it will generally be more economical to dilute it before use with additional water. Such dilution may be varied within wide limits without loss of the anti-tack characteristics, but as substantial dilution, for example ten-fold dilution, will result in loss of stability of the colloidal dispersion, it should then be used immediately, with agitation, to avoid sedimentation.

The composition, in its neat or diluted form, may be applied to the materials being treated by any customary liquid application process, such as dipping, spraying or brushing for example, this then being followed by a drying period so that a coherent durable non-adhesive film or coating is produced.

Although the composition is especially useful as a parting or separating agent for treating sheets of natural or synthetic rubber compounds in the pre-vulcanised state so as to prevent the sheets adhering together during storage prior to final processing, it is also useful for a similar purpose in the manufacture of products from plastic materials, asbestos or bituminous or asphaltic compositions which have a similar tendency towards surface tackiness.

Having thus set forth and disclosed the nature of this invention, what is claimed is:

1. A liquid anti-tack composition consisting essentially of:
   a. a soap constituent comprising at least one water soluble salt of an unsaturated fatty acid having between 16 and 24 carbon atoms,
   b. a synthetic detergent selected from the group consisting of a water soluble salt of an alkyl ether sulphate and a water soluble salt of an alkyl alcohol sulphate, and
   c. a colloidal clay constituent including at least a strong gelling grade of bentonite in an amount effective to produce a stable aqueous colloidal dispersion,
   d. said constituents being established in a water base, stable homogeneous colloidal dispersion,
   e. the amount of the synthetic detergent constituent expressed in parts by weight of the total composition being less than the amount of the soap constituent expressed in parts by weight.

2. An anti-tack composition as defined in claim 1 wherein:

said at least one fatty acid has at least one double bond and 18 carbon atoms in the form of a water soluble salt.

3. An anti-tack composition as defined in claim 2 wherein:
said fatty acid is selected from the group consisting of oleic acids and ricinoleic acid.

4. An anti-tack composition as defined in claim 2 wherein:
the proportion of water is between 60 and 80 percent expressed as parts by weight of the total composition.

5. An anti-tack composition as defined in claim 2 wherein the amount of said soap constituent expressed as the proportion by weight of the total weight of the composition is between 5 and 20 percent, the amount of the synthetic detergent constituent is less than said amount of the soap constituent and is greater than 1.5 percent by weight of the total weight, and the amount of said strong gelling grade bentonite is within the range 1 to 10 percent by weight.

6. An anti-tack composition as defined in claim 2 wherein said clay constituent includes finely divided colloidal kaolin.

7. An anti-tack composition as defined in claim 1 wherein:
the pH is sufficient to constitute slightly alkaline conditions.

8. An anti-tack composition as defined in claim 1 wherein:
said water soluble salts are alkali metal salts.

9. A liquid anti-tack composition consisting essentially of
a. a soap constituent comprising at least one water soluble salt of an unsaturated fatty acid having between 16 and 24 carbon atoms,
b. a synthetic detergent selected from the group consisting of a water soluble salt of an alkyl ether sulphate and a water soluble salt of an alkyl alcohol sulphate,
c. a colloidal constituent comprising at least a strong gelling grade of bentonite in an amount effective to produce a stable aqueous colloidal dispersion, and
d. an alginate salt in an amount effective to enhance the properties of the other constituents,
e. said constituents being established in a water base, stable homogeneous colloidal dispersion,
f. the amount of the synthetic detergent constituent expressed in parts by weight of the total composition being less than the amount of the soap constituent expressed in parts by weight.

10. A method of making a liquid anti-tack composition comprising the steps of:
a. heating a water base to an elevated temperature sufficient to effect saponification of a mixture of oleine oil and a caustic alkali,
b. adding to said heated water base oleine oil and a caustic alkali,
c. maintaining the mixture thereby formed at said elevated temperature for a time sufficient to saponify the oleine oil and to convert substantially the whole of the fatty acid content thereof into the corresponding alkali metal salt to produce a soap solution,
d. adding to said soap solution a synthetic detergent selected from the group consisting of a water soluble salt of an alkyl ether sulphate and a water soluble salt of an alkyl alcohol sulphate,
e. completely mixing said soap solution and said synthetic detergent while said elevated temperature is maintained by continued heating,
f. adding to the mixture a colloidal clay constituent including at least a strong gelling grade of bentonite in an amount effective to produce a stable aqueous colloidal dispersion,
g. agitating the mixture fully to disperse said colloidal clay constituent and continuing said agitation at said elevated temperature for a time sufficient to establish a stable homogeneous colloidal dispersion,
h. controlling the pH of the mixture to maintain slightly alkaline conditions, and
i. cooling the mixture with continued agitation until ambient temperature is attained.

11. An anti-tack composition as defined in claim 1 wherein:
said bentonite comprises hydrated aluminum silicates.

12. An anti-tack composition as defined in claim 1 wherein:
said bentonite is in a finely divided form and includes sodium as the principal alkali metal constituent.

* * * * *